May 26, 1953  C. B. FRANCIS  2,639,980
APPARATUS FOR DETERMINING CARBON AND SULFUR
Filed Feb. 8, 1950  2 Sheets-Sheet 1
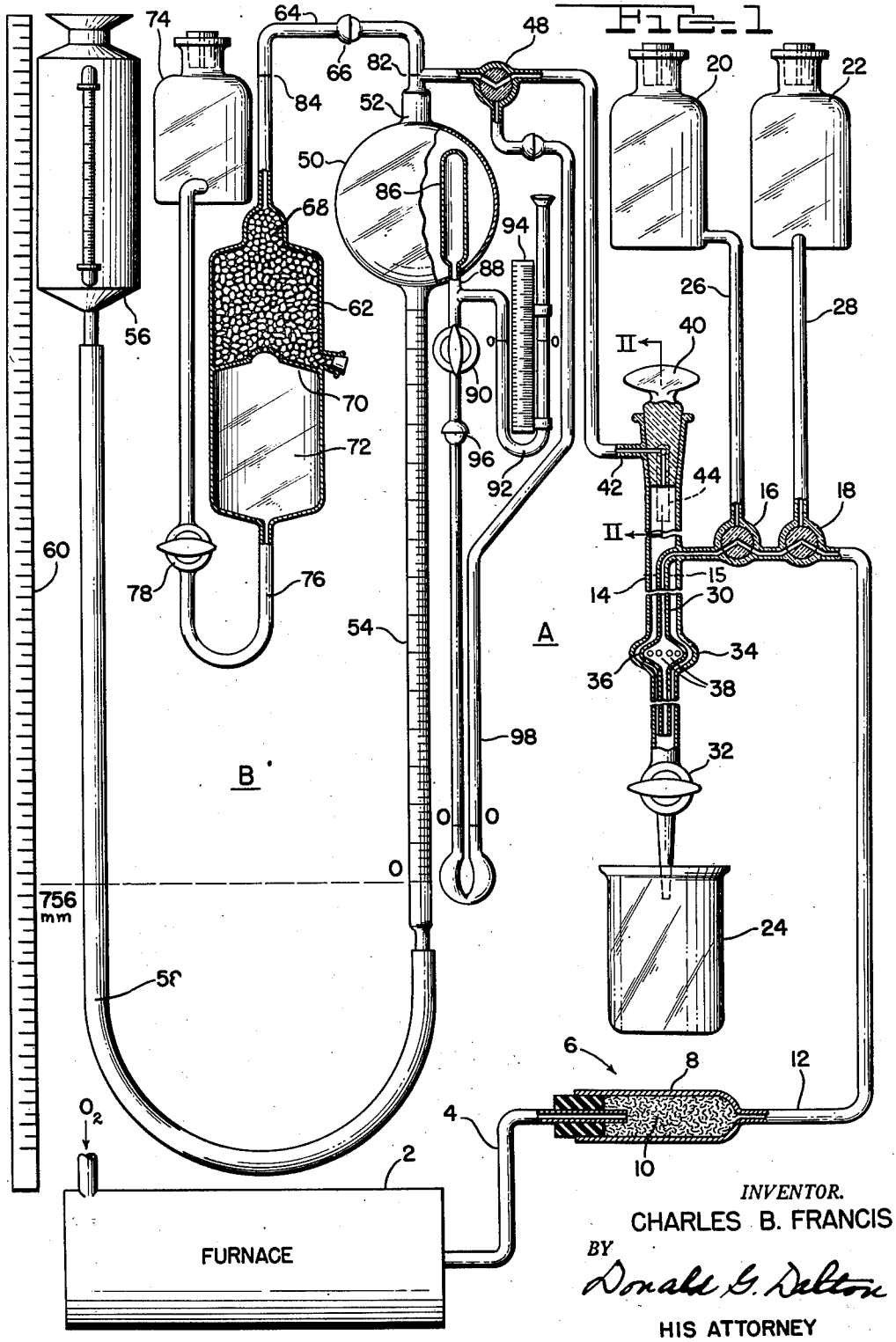
INVENTOR.
CHARLES B. FRANCIS
BY
Donald G. Dalton
HIS ATTORNEY May 26, 1953 C. B. FRANCIS 2,639,980
APPARATUS FOR DETERMINING CARBON AND SULFUR
Filed Feb. 8, 1950 2 Sheets-Sheet 2
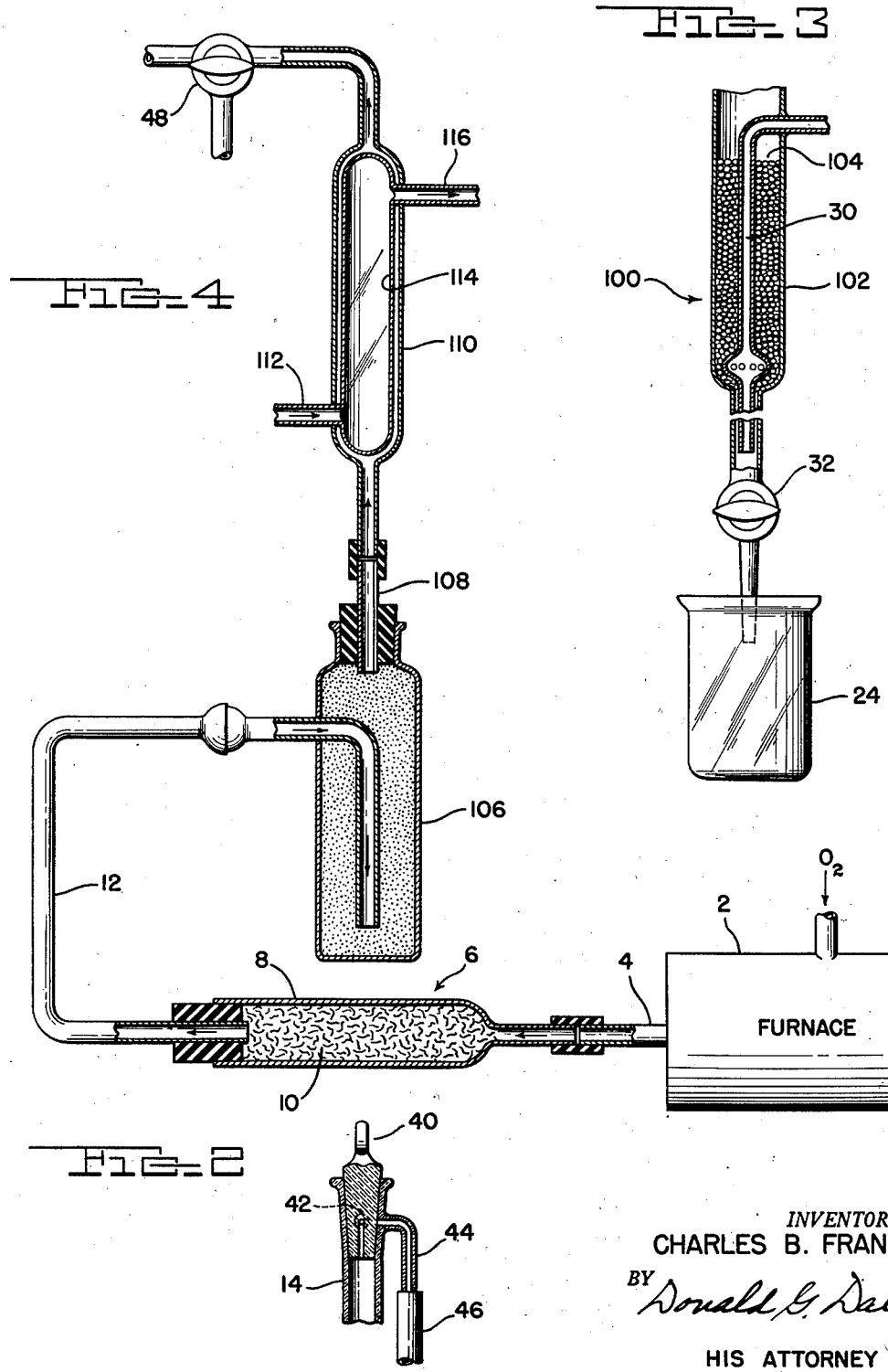
INVENTOR.
CHARLES B. FRANCIS
BY Donald G. Dalton
HIS ATTORNEY Patented May 26, 1953

2,639,980

UNITED STATES PATENT OFFICE 2,639,980

APPARATUS FOR DETERMINING CARBON AND SULFUR

Charles B. Francis, Pittsburgh, Pa.

Application February 8, 1950, Serial No. 143,054

4 Claims. (Cl. 23—254)

1

This invention relates to apparatus for determining the amount of carbon, sulphur and oxides thereof in various materials and more particularly to the determination of carbon and sulphur in iron and ferrous alloys. The amounts of carbon and sulphur in steel have been determined by direct combustion of the metal in oxygen by various methods. However, it is necessary in such methods to determine carbon and sulphur on separate samples of steel with separate apparatus. Because of this separate analysis the time consumed in determining carbon and sulphur is relatively long.

It is therefore an object of my invention to provide apparatus for determining carbon and sulphur from a single sample of the material being analyzed.

It is also an object of my invention to provide apparatus for determining the carbon content of a substance.

These and other objects will be more apparent after referring to the following specification and attached drawings, in which:

Figure 1 is a schematic view of apparatus of my invention;

Figure 2 is a sectional view taken on the line II—II of Figure 1;

Figure 3 is a schematic view of a second embodiment of part of the apparatus; and Figure 4 is a schematic view of another embodiment of my invention for use in determining the amount of sulphur.

Referring more particularly to Figure 1 of the drawings, reference numeral 2 discloses a conventional high temperature tube furnace. The tube of this furnace is made of highly refractory non-porous material that will withstand temperatures up to 3000° F. without softening. The tube preferably has an internal diameter not exceeding 25 mm. and a length not exceeding 760 mm. A refractory boat containing the sample of steel to be analyzed is placed in this tube and the sample is completely oxidized by passing oxygen through the hot tube. A conduit 4 extends from the furnace 2 to a filter 6 which may be a glass tube 8 packed with cotton 10. A conduit 12 leads from the filter 6 to the sulphur analyzing unit indicated generally by the reference character A. As shown in Figure 1, the unit A consists of a special absorption vessel 14, two three-way stop cocks 16 and 18, a silver nitrate reservoir 20 having a mark 15 thereon, a water reservoir 22, and a beaker 24. The three-way stop cocks 16 and 18 are connected in the conduit 12 and are connected by conduits 26 and

2

28 to the reservoirs 20 and 22, respectively. The special absorption vessel 14 has a gas dispersing tube 30 therein which has one end connected to the stop cock 16 and its other end terminating adjacent a stop cock 32 at the lower end of the absorption vessel 14. The vessel 14 is provided with a bulbous portion 34 for receiving a similar bulbous portion 36 on the tube 30. The bulbous portion 36 is provided with small openings 38 spaced around its periphery. The top part of the vessel 14 is provided with a stop cock 40. In its normal position the stop cock 40 connects the interior of the vessel 14 to a conduit 42 which leads to a carbon absorption unit B. By turning stop cock 40 counterclockwise through an angle of 45° the exit to conduit 42 is closed and by turning it clockwise through an angle of 45° the interior of the vessel 14 is connected to the outside air through a second conduit 44 as best shown in Figure 2. This second conduit 44 is preferably connected by means of a rubber hose 46 to the beaker 24 which is located beneath the vessel 14. The conduit 42 is connected to a two-way stop cock 48. One end of the stop cock 48 is connected to a gas reservoir 50 by means of a conduit 52. The bottom of the gas reservoir 50 is connected to a graduated burette 54 which in turn is connected to a leveling bottle 56 by means of a rubber hose or conduit 58. A gage 60 is provided adjacent the leveling bottle 56 and hose 58. The conduit 52 is also connected to an absorption tower 62 by means of a conduit 64. Conduits 52 and 64 are connected by means of a ball-and-socket joint 66. The absorption tower 62 is filled with glass beads 68. A perforated partition 70 separates the absorption tower 62 from a gas reservoir 72 while permitting flow of fluid therebetween. The bottom of this reservoir 72 is connected to a leveling bottle 74 by means of a rubber hose or conduit 76 having a stop cock 78 therein. An indicating mark 82 is provided on the conduit 52 and a similar mark 84 is provided on the conduit 64. A compensator tube 86 is contained within the gas reservoir 50 and extends through the lower part thereof to a conduit 88 which is provided with a stop cock 90. Also connected to the conduit 88 is a mercury manometer tube 92. A double scale 94 is provided between the legs of the manometer 92. The bottom of the conduit 88 is connected through a ball-and-socket joint 96 to one leg of a water manometer tube 98. The other leg of the tube is connected to the stop cock 48.

In some instances the absorption tube 14 may be made in a different manner than shown in Figure 1. As shown in Figure 3, the absorption tube 14 is replaced by a tube 100 having a cylindrical upper portion 102 of sufficient diameter to admit the dispersing tube 30. The upper portion 102 is partly filled with glass beads 104 to occupy about 60% of the space.

The apparatus is prepared for operation in the following manner. The absorption tower 62 and pipette 72 are filled with 20% sodium or potassium hydroxide solution introduced through the leveling bottle 74. The leveling bottle 56 in its lowest position is then filled with a concentrated colored solution of slightly acid sodium sulphate or other salt in which $CO_2$ is only slightly soluble. The temperature of this solution, as well as the room temperature is adjusted to 72° F. The barometric reading and the specific gravity of the solution are taken and recorded for future reference. With stop cock 48 in the position shown and stop cocks 32 and 40 open to the air, the leveling bottle 56 is raised to fill the burette 54 and reservoir 50 with the solution. Since the compensator tube 86 is surrounded with the solution, the air therein will be at the same temperature as the solution.

With gas confined in burette 54 and reservoir 50, the pressure is adjusted to 755.67 ml. of mercury by raising the liquid in the leveling bottle a certain distance above the 0-line on the burette. The distance is found from the barometer reading and the specific gravity of the salt solution in the leveling bottle 56 by calculation using the formula $$(755.67 \text{ mm.} - \text{the barometer reading}) \frac{13.571}{\text{Sp. Gr. of the solution}}$$

in which 13.571 is the specific gravity of mercury at 72° F.

The pressure in tube 86 is adjusted to 756 mm. of mercury by proceeding as follows:

Before the water manometer tube 98 is connected, a drop of water is added to the mercury manometer tube 92, which is then filled to its zero line with mercury through the top of its long arm. Next, the reading of the barometer is taken, and compressed air or oxygen is introduced through stop cock 90 until the distance between the levels of mercury in the two arms of the manometer when the stop cock 90 is closed is equal to 756 mm. minus the barometer reading. If the barometer reading is above 756 mm. of mercury, the adjustment is made by applying suction to the tube leading from stop cock 90. Thus the compensator tube 86 is filled with moist air at a temperature of 72° F. under a pressure of 756 mm. of mercury and is trapped therein by closing stop cock 90. The water manometer 98 is then filled to its zero mark with a little of the same confining liquid as that used in the leveling bottle 56, and the manometer is connected as shown in Figure 1. By this arrangement it is evident that the volume of a gas may be measured at a temperature of 72° F. and 756 mm. pressure, irrespective of the temperature and pressure at which it is trapped in burette 54 and reservoir 50, by turning stop cocks 48 and 90 so that the reservoir 50 communicates with compensator tube 86, and balancing the pressure in burette 54 to equal that in tube 86 by raising or lowering leveling bottle 56. Also, it is to be noted that the compensation device when so adjusted will thereafter serve as a barometer. For this purpose the mercury manometer 92 is provided with the double scale 94 reading in millimeters on the right hand, or long arm side, and in millimeters numbered to correspond to the barometer reading on the other side. Scale 60 is graduated for the confining liquid in bottle 56 to correspond to the short arm readings on the mercury manometer.

In utilizing the apparatus of my invention, I have found it desirable to operate under the conditions set forth hereinafter. A single weight of sample, namely 2.4 g., is used as a factor weight for both carbon and sulphur. For pig iron, cast iron, and other materials containing more than 1.5% carbon, this weight is preferably reduced to 1.6 g., 1.2 g. or 0.8 g., because the $CO_2$ formed from 2.4 g. of a sample containing 1.5% carbon has a volume equal to 75 ml. which is preferably the size of burette 54.

Regarding the relation of the factor weight 2.4 g. to the sulphur content, the nitric acid set free in the sulphur absorber using silver nitrate is titrated with 0.005 normal sodium hydroxide solution standardized against a solution of sulphuric acid of the same concentration, 1 ml. of which is equivalent to 0.00008 g. of sulphur. Since the sulphur in 2.4 g. of sample containing 0.01% sulphur is 0.00024 g., 3 ml. of the standard solution is equivalent to 0.01% and 1 ml. to 0.0033%. When carefully carried out the method is truly stoichiometric, but many chemists prefer to operate under fixed conditions, in which 100% of the sulphur may not be collected, and standardize the sodium hydroxide solution against a standard sample of the same material as that to be analyzed. In this case the solution may be slightly more than 0.005 normal, but the concentration of the solution is adjusted so that 3 ml. is equivalent to 0.01% on 2.4 g. of sample. In making these titrations an indicator is necessary. Among the many indicators available, methyl red or a mixture of methyl red and methylene blue is most suitable.

The relation of the factor weight 2.4 g. to the per cent carbon is explained as follows: When burned with a great excess of oxygen, 12 g. of carbon forms 44 g. of $CO_2$, or 22.257 liters at 0° C. and 760 mm. of mercury pressure, and 24.076 liters at 72° F. under the same pressure. From this relation, 0.024 g. of carbon, which is equivalent to 1% in 2.4 g. of sample, will give 0.04815192 liter $$\frac{(24.076 \times 0.024)}{12}$$

of $CO_2$ at 72° F. and 760 mm. pressure, or 0.05 liter at 72° F. and 731.91 mm. pressure $$\frac{(0.048152 \times 760)}{0.05}$$

Therefore, at this temperature and pressure 50 ml. of $CO_2$ from a sample of 2.4 is equivalent to 1.0% carbon, or 1 ml. is equivalent to 0.02%, and 0.1 ml., easily read on the burette, is equivalent to 0.002% carbon.

However, the accuracy is affected by other factors. For example, $CO_2$ is not a true gas, and is soluble in water. In the present invention, it is considered a true gas because when measured it is mixed with many times its volume of oxygen and is, therefore, under low partial pressure. At room temperatures and low pressures, $CO_2$ approaches a true gas in its volume relations to temperatures and pressures. Also, it will be recalled that the gas mixture containing the $CO_2$ is bubbled through a dilute solution of silver nitrate, which may dissolve a little $CO_2$. But the volume of silver nitrate is very small, and the gas containing the $CO_2$ is followed by almost pure oxygen, and since the amount dissolved depends upon the partial pressure of the $CO_2$ itself, the amount retained by the silver nitrate solution, if any, is extremely small. Nevertheless, in bubbling through the silver nitrate solution, the gas becomes saturated with water vapor. Since the volume of gas is measured twice and the volume of $CO_2$ is obtained by difference, the correction is made by increasing the pressure by the vapor pressure of water at 72° F., which is known to be 23.756 mm. of mercury. Application of this correction makes the pressure at which the gas must be measured 755.67 mm. of mercury.

To avoid temperature and pressure observations and corrections to obtain the per cent carbon in every determination, it is necessary to make all readings for gas volume under exactly the same conditions of temperature and pressure. To have 1 ml. of $CO_2$ equivalent to 0.02% carbon in a sample weighing 2.4 g., these conditions are 755.7 mm. of mercury pressure and 72° F.

The procedure followed in determining the amount of sulphur and carbon in steel is as follows:

The sample is prepared in the usual manner and 2.4 grams thereof are placed in the combustion boat which in turn is placed in the combustion tube in the furnace 2. Oxygen, or in some instances air, is introduced into the combustion tube. The burette 54, reservoir 50 and conduit 52 are filled to the line 82 with the solution from bottle 56 and between 5 and 10 ml. of silver nitrate solution is introduced into the absorber 14 from the reservoir 20. The sample is then ignited in the furnace 2 and the stop cocks 16, 18 and 48 turned to the positions shown in Figure 1. The oxygen flow is continued until all the solution in reservoir 50 and burette 54 has been displaced by gas with the leveling bottle 56 at a level corresponding to the barometer reading on scales 60 and 94.

In the combustion of the sample, the iron and all other elements it contains are converted to oxides. The carbon forms carbon dioxide, which is completely liberated as soon as combustion of the sample has been completed. If oxygen is lacking during the combustion some carbon monoxide may be formed, but being a gas incapable of uniting with metallic oxides, it unites with any incoming oxygen to form carbon dioxide. Thus the carbon is swept out of the combustion tube by the oxygen flow immediately following the combustion of the sample. The sulphur is also oxidized to form sulphur dioxide, with the possibility that some of the $SO_2$ is catalytically oxidized to sulphur trioxide $SO_3$. These gases, unlike the oxides of carbon, are capable of uniting with the metallic oxides, forming sulfites and sulfates which are held in solution by the liquid or semi-fluid slag formed. Consequently, only a part of the sulphur escapes as $SO_2$ during and immediately following the combustion, and the remainder is evolved more slowly from the slag mass as the sulfates and sulfites are decomposed by heat from the furnace. Therefore the gas in reservoir 50 and burette 54 will contain all the carbon in the sample, but all of the sulphur will not be driven off at this time.

As soon as the liquid in reservoir 50 and burette 54 is replaced with gas as set forth above, stop cock 40 is turned to shut off the flow of gas to conduit 42 and to exhaust the gas through tube 46 to beaker 24. The rate of flow of the oxygen into the furnace 2 is also increased to evolve the remainder of the sulphur. While this evolution is proceeding the carbon is determined by turning stop cocks 48 and 90 to connect reservoir 50 to compensator tube 86. The leveling bottle 56 is then raised or lowered until the miniscus of the liquid in tube 98 is at the 0-line. The level of the liquid in burette 54 is then taken and recorded. To absorb the $CO_2$ contained in the gas, stop cock 48 is closed, stop cock 78 is opened, and the leveling bottle 56 is raised to its highest position, thus forcing the gas in burette 54 and reservoir 50 into the absorption tower 62 where the $CO_2$ is absorbed by the sodium hydroxide solution. The leveling bottle 56 is then lowered to draw back part of the gas into the reservoir 50 and burette 54, after which it is raised to force the gas back into tower 62. This process may be repeated until all the $CO_2$ is absorbed. Finally the gas is forced back into reservoir 50 and burette 54 and leveling bottles 56 and 74 are manipulated until the liquid level in tube 64 is on line 84. Stop cock 78 is then closed, thus fixing the liquid level on line 84 after which stop cocks 48 and 90 are opened to compensator tube 86. The volume of gas balanced against the compensator is then read on burette 54 and recorded. The difference between the first and second readings gives the volume in milliliters of $CO_2$ contained in the gas at 72° F. and 755.7 mm. of mercury pressure, which, multiplied by 2, gives the carbon content of the sample in hundredths of a per cent.

To find the per cent sulphur in the gas, the oxygen flow is turned off at the end of five minutes or after all the sulphur has evolved, and stop cock 32 is turned to permit the silver nitrate solution in the absorber 14 to flow into the titrating beaker 24. To rinse the absorber, stop cock 32 is closed and stop cock 18 is turned to connect with the water reservoir 22 until the absorber 14 is filled with water, after which stop cock 18 is closed and stop cock 32 is opened, thus permitting the rinse water to flow into the titrating beaker 24. After the addition of 1 or 2 drops of indicator solution, the acid equivalent to the sulphur in the sample is titrated with a standard solution of sodium hydroxide (approximately 5 thousandths normal) from a burette. The number of milliliters of this solution used to titrate the silver nitrate solution, divided by three, gives the sulphur content of the sample in hundredths of a per cent.

To prepare the apparatus for the next determination, stop cock 18 is turned as shown in Figure 1 and stop cock 40 is turned to connect with unit B. The gas in the burette 15 is discarded by opening stop cock 48 and raising the leveling bottle 56 to its highest position, thus causing the gas to flow through stop cocks 40 and 32 until the displacing solution reaches the line 82. This leaves the small amount of gas in the capillary tube connection 42 under atmospheric pressure. Stop cock 40 is then turned to connect with the atmosphere, stop cock 32 is closed, and stop cock 16 is turned to admit silver nitrate solution from reservoir 20 until the liquid rises to the mark 15 on the wall of absorber 14. Stop cocks 16 and 18 are then turned to connect the absorber with the combustion tube in furnace 2. The boat is withdrawn from the combustion tube and placed under cover to cool, after which the apparatus is ready to receive another sample.

When it is not desired to determine sulphur or when it is desired to determine sulphur gravimetrically, the unit A is replaced by the apparatus shown in Figure 4. As shown there, tube 12 is connected to an absorption bottle 106 which is packed with manganese dioxide. The top of the bottle 106 is connected to the stop cock 48 by means of a conduit 108 and a cooler 110. Heat absorption in the cooler is affected by attaching the rubber hose 58 to a tube 112 which is connected to a vessel 114 contained within the cooler 110. A conduit 116 leading from the vessel 114 is connected to the bottom of the burette 54.

The procedure when using the apparatus of Figure 4 in place of unit A is the same as that described above in so far as the determination of carbon is concerned. In determining sulphur the manganese dioxide absorption bottle is weighed before gas flow from the sample in furnace 2 starts and also after all the sulphur is driven from the sample.

The gain in weight of the absorber, divided by two, gives the weight of sulphur contained in the portion of sample used for the determination, which is converted to per cent by multiplying by 100 and dividing by the weight of sample used for the determination.

As previously mentioned the apparatus may be used for the analysis of gases. For this purpose the total volume of burette 54, reservoir 50, and absorber 14 is determined by measuring the water required to fill them. The absorber 14 is filled with dilute silver nitrate solution, and gas is admitted slowly while the excess silver nitrate is withdrawn through stop cock 32. After the liquid in reservoir 50 has been displaced by the gas, all of the silver nitrate is withdrawn and the gas contained in the absorber 14 is driven over into the $CO_2$ apparatus by displacement with rinse water. The silver nitrate solution and washings are then titrated and the $CO_2$ determined as described above for the analysis of steel. The milliliters of 0.005 normal sodium hydroxide used to titrate the sample multiplied by 0.6016 gives the ml. of $SO_2$ in the gas measured at 72° F. and 755.7 mm. of mercury pressure. The volume of $SO_2$ added to the first measured volume gives the total volume of sample used, and the volume of $CO_2$, divided by the total volume, gives the per cent $CO_2$ by volume.

The compensator of unit B can be used for the determination of other constituents of a gas. For example, in carbonitriding furnace atmospheres the apparatus, with slight modification, can be used for the rapid determination of $SO_2$, CO and ammonia, $NH_3$. By substituting a standard solution of sulphuric acid for the silver nitrate, the $NH_3$ may be absorbed, and after the absorption of $CO_2$ as described, the CO may be absorbed in another pipette. In carbonitriding, however, determination of the $CO_2$ and $NH_3$ is sufficient to control the operation.

While several embodiments of my invention have been shown and described, it will be apparent that other adaptations and modifications may be made without departing from the scope of the following claims.

I claim:

1. Apparatus for measuring the volume of gases under constant conditions of temperature and pressure comprising a gas burette, a liquid containing leveling bottle connected to the bottom of the burette, a reservoir connected to the top of said burette, a gas containing chamber enclosed in said reservoir, a manometer tube having one leg connected to said chamber, a connection between the second leg of said manometer tube and the top of said reservoir, a stop cock in said last named connection, said stop cock having an outlet to the atmosphere, and a second manometer tube connected to the first named manometer tube at a point adjacent said chamber.

2. Apparatus for determining the amount of carbon dioxide in a gas sample comprising a gas burette, a liquid containing leveling bottle connected to the bottom of the burette, a reservoir connected to the top of said burette, a gas containing chamber enclosed in said reservoir, a manometer tube having one arm connected to said chamber, a connection between the second arm of said manometer tube and the top of said reservoir, a stop cock in said last named connection, said stop cock having an outlet to the atmosphere, a second manometer tube connected to the first named manometer tube at a point adjacent said chamber, a carbon dioxide absorption tower having its top connected to the last named connection adjacent the top of said reservoir, and a leveling bottle connected to the bottom of said absorption tower.

3. Apparatus for determining the per cent sulphur and per cent carbon in the same sample of a substance, which comprises a furnace for heating the sample in the presence of oxygen to evolve gases, an outlet from said furnace for said gases, a sulphur absorber connected to said outlet, a conduit leading from said absorber, a gas burette, a liquid containing leveling bottle connected to the bottom of the burette, a reservoir connected to the top of said burette, a gas containing chamber enclosed in said reservoir, a manometer tube having one leg connected to said chamber, a connection between the second leg of said manometer tube and the top of said reservoir, a stop cock in said last named connection, said stop cock having an outlet to said conduit, a second manometer tube connected to the first named manometer tube at a point adjacent said chamber, a carbon dioxide absorption tower having its top connected to the last named connection adjacent the top of said reservoir, and a leveling bottle connected to the bottom of said absorption tower.

4. Apparatus for determining the per cent sulphur and per cent carbon in the same sample of a substance comprising a furnace for heating the sample in the presence of oxygen to evolve gases, an outlet from said furnace for said gases, a cylindrical vessel, the top section of said vessel having two outlets, a three-way stop cock in said top section for closing said outlets, the bottom section of said vessel having a smaller diameter than the top section, said bottom section having an opening therein, a stop cock in said bottom section, a gas dispersing tube in said vessel, said tube having a bulbous portion intermediate its ends with openings therein, the bottom of said tube being open and extending to a point above the last named stop cock, the top of said tube extending through the wall of said vessel below the top thereof, two three-way stop cocks in the portion of said tube outside said vessel, a reservoir adapted to contain sulphur absorbing liquid, a reservoir adapted to contain a rinsing liquid, a connection between one of the last named stop cocks and the first named reservoir, and a connection between the other of the last named stop cocks and the last named reservoir, a connection between said tube and said outlet from said furnace, a gas burette, a liquid containing leveling bottle connected to the bottom of the burette, a reservoir connected to the top of said burette, a gas containing chamber enclosed in said reservoir, a manometer tube having one leg connected to said chamber, a connection between the second leg of said manometer tube and the top of said reservoir, a stop cock in said last named connection, said last named stop cock having a connection to one of the outlets from said top section, a second manometer tube connected to the first named manometer tube at a point adjacent said chamber, a carbon dioxide absorption tower having its top connected to the last named connection adjacent the top of said reservoir, and a leveling bottle connected to the bottom of said absorption tower.

CHARLES B. FRANCIS.

References Cited in the file of this patent

UNITED STATES PATENTS

| Number | Name | Date |
|---|---|---|
| 744,132 | Tutwiler | Nov. 17, 1903 |
| 1,436,219 | Van Brunt | Nov. 21, 1922 |
| 1,448,901 | Moreland | Mar. 20, 1923 |
| 1,485,757 | Alsberg et al. | Mar. 4, 1924 |
| 1,719,864 | Zimmerman | July 9, 1929 |
| 1,840,952 | Hemminger | Jan. 12, 1932 |
| 2,001,581 | Matuszak | May 14, 1935 |
| 2,094,357 | Huff | Sept. 28, 1937 |
| 2,147,607 | McMillan et al. | Feb. 14, 1939 |
| 2,224,044 | Francis et al. | Dec. 3, 1940 |
| 2,397,846 | Dietert | Apr. 2, 1946 |

FOREIGN PATENTS

| Number | Country | Date |
|---|---|---|
| 306,095 | Germany | June 20, 1917 |

OTHER REFERENCES

Altieri, "Gas Analysis," pages 164, 174, 216, 293. Published by American Gas Assn., 420 Lexington Ave., N. Y. C., 1945.